Patented June 28, 1932

1,864,554

UNITED STATES PATENT OFFICE

EBENEZER EMMET REID, OF BALTIMORE, MARYLAND, ASSIGNOR TO E. I. DU PONT DE NEMOURS & COMPANY, OF WILMINGTON, DELAWARE, A CORPORATION OF DELAWARE

PROCESS FOR REDUCING THE VISCOSITY OF CELLULOSE ETHERS

No Drawing. Original application filed June 6, 1928, Serial No. 283,466, and in Great Britain and Australia in 1929. Divided and this application filed February 7, 1930. Serial No. 426,776.

This application is a division of applicant's copending application Serial No. 283,466, filed June 6, 1928, for process for reducing the viscosity of cellulose derivatives.

This invention relates to cellulose derivatives having less than normal viscosity. It relates more particularly to a process for lowering the viscosity of cellulose derivatives to viscosities much lower than normal, and which are suitable for use where cellulose derivatives having subnormal viscosity combined with normal film forming properties are desired. One of the disadvantages of cellulose derivatives for use in solutions and in coating compositions is the high viscosity of the product as made by the usual methods. This difficulty is common to all derivatives of cellulose, and has interfered with the general commercial application of such derivatives, especially in coating compositions such as lacquers, varnishes and the like, in which the cellulose derivative is dissolved in a volatile solvent. A highly viscous product when dissolved and thinned to a consistency usable for such purposes carries such a small proportion of film forming ingredient and such a high content of expensive solvents, that the dried film is too thin for practical purposes, and too expensive to appeal to the lacquer trade.

Methods for reducing the viscosity of cellulose nitrate, which have considerable merit, have been worked out, but the application of such methods, however, is in general practicable only for certain specific purposes. For the balance of the cellulose derivatives, however, practicable methods of reducing viscosity without sacrifice of essential film forming qualities have hitherto been lacking. It is known that cellulose derivatives having viscosities less than normal may be produced by various drastic treatments either of the cellulose or of the cellulose derivatives, but it has been found in general that with such drastic treatments the reduction in viscosity is accompanied by a degradation of the cellulose nucleus to such an extent that the film forming properties of the cellulose derivatives are greatly impaired or even destroyed altogether.

This invention has as an object the preparation of low viscosity cellulose derivatives having excellent film forming qualities. A further object is the preparation of low viscosity cellulose derivatives by a process which is easily controlled, inexpensive, and practicable from every consideration.

These objects are accomplished by the following invention, which consists in its broadest aspect in treating a quantity of cellulose derivative with an acid gas until the cellulose derivative has adsorbed sufficient acid gas to cause a slow, internal transformation and resulting viscosity decrease.

To practice my invention any convenient quantity or charge of cellulose derivative, preferably air dried so as to be substantially dry, is placed in a container provided with means for agitating the charge of cellulose derivative. Through this agitated charge I pass a stream of acid gas, for example, hydrochloric acid gas, which may or may not be diluted with some relatively non-reactive gas. The temperature of this acid gas treatment is preferably maintained at or slightly above normal room temperature, e. g. 25° C.

When a sufficient amount of the acid gas has been adsorbed by the cellulose derivative, the passage of the gas through the charge should be discontinued. The amount of acid gas thus adsorbed is approximately .1% to 5% of the weight of the cellulose derivative. The acid treated cellulose derivative is then permitted to season at a suitable temperature, as the result of which a gradual, indestructive internal reaction or transformation takes place as a result of which the viscosity of the cellulose derivative is gradually decreased without damage to the cellulose nucleus. When the desired reduction in viscosity has been attained, as determined by tests with samples of the cellulose derivative dissolved in a suitable solvent, the charge is quenched in water and thereafter washed until the acid has been removed. The cellulose derivative thus freed from acid is dried, and is then ready for solution in any of the well-known solvents which are used in lacquers or other coating compositions.

Several examples of my invention are as follows:

Example 1.—500 parts of air-dried cellulose acetate, which is in a fibrous, porous, or finely divided form, and which has a viscosity of about 2,000 centipoises (as measured in a 10% solution in acetone at 25° C.), is placed in a rotatable container. While the charge is being agitated by the rotation of the container, hydrochloric acid gas (dried over sulphuric acid) alone or mixed with air, is passed into or through the charge until the cellulose acetate has adsorbed between 1.5% and 2% of its weight of hydrochloric acid gas. The cellulose acetate with its adsorbed hydrochloric acid gas is discharged into a stationary container or the agitation of the original rotating container is discontinued, and the charge of cellulose acetate is then allowed to stand at ordinary room temperature (25° C.) for twenty-four to forty hours. Samples are taken at various intervals, and viscosity determinations are made thereof in 10% solutions in acetone. When the cellulose acetate is of the desired viscosity, the charge is drowned in water, washed free from acid, and dried. The viscosity of an ordinary sample of cellulose acetate after treatment by the aforementioned process, which includes standing or seasoning for forty hours before removal of the acid, gives a viscosity in the neighborhood of 45 centipoises when determined in a 10% solution with acetone as the solvent.

Example 2.—500 parts of cellulose ether, which has been prepared by any of the known methods, is washed and dried at 95° to 100° C. The viscosity of such a charge of cellulose ether may be in the neighborhood of 30,000 centipoises as determined at 25° C. by the falling ball method, the cellulose ether being in a 12% xylol solution. The dry ethyl cellulose is placed in a container which can be agitated and heated. While the charge is being agitated hydrochloric acid gas (dried over sulphuric acid) is passed through the charge until an appreciable amount of hydrochloric acid gas has been adsorbed by the cellulose ether. The hydrochloric acid gas adsorbed will amount to about .3% of the weight of the cellulose ether. The container is then closed and heated at about 100° C. until the desired viscosity has been attained. This is determined by extracting samples of the cellulose ether and dissolving them in a xylol, in which the viscosity determination can be made by the falling ball method. The charge is then transferred to an enameled kettle or a wooden vat where it is washed thoroughly with water to remove the acid. A final treatment with a very dilute solution of alkali facilitates the removal of the acid, although this step is not essential. The product is finally dried at 65° to 100° C., and is then ready for use. The viscosity of a charge having been heated for two hours at 100° after the acid treatment was found to be close to 400 centipoises.

Hydrochloric acid gas is not the only acid which can be employed in my process. Other volatile inorganic acids may be used, such as hydrobromic acid or nitric acid, or volatile organic acids, as for example, formic acid, acetic acid; or volatile acid anhydrides such as acetic anhydride or sulphur dioxide; volatile substances which produce acids in the presence of water, as for example chlorine gas, nitrogen tetroxide, acetyl chloride, thionyl chloride. It will be obvious that where substances are employed which are acid anhydrides or acid forming substances, it will be necessary to have a small amount of water either in the charge of cellulose derivative or in the acid gas, which is passed through the charge. The expression "acid gas", as used in this specification and these claims, is meant to include various substances of an acidic nature or acid forming nature which have a substantial vapor pressure at or slightly above room temperatures (25° C.); this will include organic, inorganic acids, organic and inorganic acid anhydrides, as well as substances which react with water to produce acids, as described and exemplified above. Where it is desired to prolong the time necessary to accomplish the adsorption of the gas by the cellulose derivative, the acid gas may be diluted by a non-reactive or inert gas, such as air or nitrogen. The amount of true acid gas present in such a mixture may be reduced as low at 5%, or even less, of the volume of the total gases passed through the charge of cellulose derivative. The actual acid gas adsorption may vary between .1% and 5% of the weight of the charge.

The temperature of the acid treatment step is generally, as stated above, room temperature or temperatures not much above room temperature. The temperature of the seasoning step may vary, depending upon the amount of acid which has been adsorbed and the degree to which it is desired to decrease the viscosity of the cellulose derivative, as well as the specific cellulose derivative which is being treated. In general temperatures not much removed from room temperatures are employed in the seasoning of cellulose acetate, which has been acid treated by my process. Ethyl cellulose, on the other hand, is somewhat less sensitive to the acid than cellulose acetate, and is preferably seasoned at a temperature of approximately 100° C., although considerably lower temperatures may be employed. It is obvious, of course, that the length of time necessary for seasoning the acid-treated-derivative will be modified in proportion to the temperature at which the seasoning is carried out, as well as in proportion to the amount of viscosity reduction which it is desired to obtain. In general, for the seasoning operation it is preferable to select a temperature well below the temperature at which the cellulose derivative begins to become unstable. It is preferable, also, to operate below the temperature at which the cellulose derivative begins to lose viscosity to an appreciable degree as the result of the application of heat alone. Reduction in vicosity, as a result of heat alone, is accompanied by a degradation of the cellulose nucleus which involves a marked sacrifice of quality in the finished derivative.

As a modification of my process it is possible to merge the acid treatment step and the seasoning step. In effect this is a prolongation of the acid treatment step and elimination of the seasoning step. This can be accomplished by passing the acid gas through the cellulose derivative for a given time, depending on the temperature and the concentration of the gas, such that the adsorption of the acid gas and the reduction of the viscosity occur partially simultaneously in one step. The acid gas may, if desired, be more or less diluted with a neutral or nonreactive gas.

My method may be employed with inorganic as well as organic derivatives of cellulose. Thus, it may be employed to reduce the viscosity of nitrocellulose as well as cellulose acetate and cellulose ethers. Individual cellulose derivatives will require somewhat different amounts of acid gas treatment, different temperatures and times of treatment as well as temperatures and times of seasoning in order to produce the optimum results.

Films prepared by my process are clear and non-brittle. Films prepared by the process of treating cellulose acetate in accordance with my invention have been tested in the Pfund Flexor. Films .005 inches thick may be flexed from four to six times before breaking. Low viscosity cellulose ether obtained by my method when dissolved in a volatile solvent gave on drying hard, tough films indicating that the normal film forming properties of high viscosity cellulose ether had not been appreciably impaired by the viscosity reduction treatment.

My process has other advantages in that it is easily controlled and does not require a huge outlay of expensive apparatus. It requires but a short amount of time to reduce the viscosity of cellulose derivatives to a required degree, and thus makes possible a rapid turnover, which is a distinct advantage in large scale manufacture. It is possible to attain a degree of viscosity reduction with respect to cellulose acetate and cellulose ethers which has never been attained before without serious degradation of the final product. My process thus makes possible the use of organic cellulose derivatives as well as cellulose nitrate in coating compositions.

Although my invention has been described with respect to certain specific examples, it will be understood that my invention is not limited to these examples, but may be modified in various respects without departing from the scope thereof, as set forth in the appended claims.

I claim:

1. The process of reducing the viscosity of a cellulose ether which comprises bringing an acid gas in contact with a charge of the ether of cellulose.

2. The process of reducing the viscosity of an ethyl ether of cellulose which comprises bringing an acid gas in contact with a charge of an ethyl ether of cellulose.

3. The process of reducing the viscosity of a cellulose ether which comprises bringing hydrochloric acid gas admixed with a relatively inert gas in contact with a charge of substantially dry ether of cellulose until said ether of cellulose has adsorbed an appreciable amount of hydrochloric acid gas less than 5% of the weight of the said ether of cellulose, permitting the acid treated ether of cellulose to season at a temperature above room temperature but not substantially above 100° C., and thereafter washing it free from acid and drying.

4. The process of reducing the viscosity of a cellulose ether which comprises bringing hydrochloric acid gas admixed with a relatively inert gas in contact with a charge of substantially dry ethyl ether of cellulose until said ethyl ether of cellulose has adsorbed an appreciable amount of hydrochloric acid gas less than 5% of the weight of said ethyl ether of cellulose, permitting the acid treated ethyl ether of cellulose to season at a temperature above room temperature but not substantially above 100° C., and thereafter washing it free from acid and drying.

5. The process of reducing the viscosity of a cellulose ether which comprises bringing an acid gas in contact with a charge of an ether of cellulose until said ether has adsorbed from 0.1% to 5.0% by weight of said acid gas and permitting the treated ether to season at a temperature above room temperature but not substantially above 100° C., and thereafter washing it free from acid and drying.

In testimony whereof, I affix my signature.

EBENEZER EMMET REID.